(12) United States Patent
Yasuda

(10) Patent No.: US 6,335,969 B1
(45) Date of Patent: Jan. 1, 2002

(54) CALLER'S TELEPHONE NUMBER STORAGE APPARATUS, A PERSONAL COMPUTER, AND A CALLER'S TELEPHONE NUMBER STORAGE METHOD, AND A STORAGE MEDIUM

(75) Inventor: Nobuyuki Yasuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/438,497

(22) Filed: Nov. 12, 1999

(30) Foreign Application Priority Data

Nov. 11, 1998 (JP) .................................................. 10-335047

(51) Int. Cl.[7] .................................................. H04M 1/56
(52) U.S. Cl. .................................. 379/142.15; 379/142.13
(58) Field of Search .................................. 379/112, 142, 379/93.17, 93.23, 93.05, 247, 441, 442, 140, 130, 199

(56) References Cited

U.S. PATENT DOCUMENTS

| | | | |
|---|---|---|---|
| 4,656,318 A | * 4/1987 | Noyes ......................... | 379/93.17 |
| 5,343,516 A | * 8/1994 | Callele et al. ................. | 379/142 |
| 5,671,269 A | * 9/1997 | Egan et al. ..................... | 379/142 |
| 5,727,047 A | * 3/1998 | Bentley et al. ............. | 379/93.17 |
| 5,781,621 A | * 7/1998 | Lim et al. ..................... | 379/142 |
| 5,819,069 A | * 10/1998 | Wong et al. .................. | 395/500 |
| 5,844,975 A | * 12/1998 | Sugawara et al. ........... | 379/142 |
| 6,111,939 A | * 8/2000 | Brabanec ..................... | 379/142 |

* cited by examiner

*Primary Examiner*—Binh Tieu
(74) *Attorney, Agent, or Firm*—Foley & Lardner

(57) ABSTRACT

In a caller telephone number storage system, when the polarity inversion detector 6 detects the polarity inversion of the line 7, the timer controller 12 starts measuring six seconds. When the short ringer detector 11 detects a short ringing from the line 7 supplied via the ring signal binary encoder 5, a short ringer detection signal is sent to the relay controller 14. When the relay controller 14 receives the short ringer detection signal, the timer controller 12 controls the line closure relay 13 within six seconds to dc close the line 7. Thereafter, the data receiver 15 sends the number display data to store it into the data storage means 16. At the same time, the data receiver 15 sends reception completion signal to the timer controller 12. Thus, the timer is cleared.

20 Claims, 2 Drawing Sheets

Figure 1:
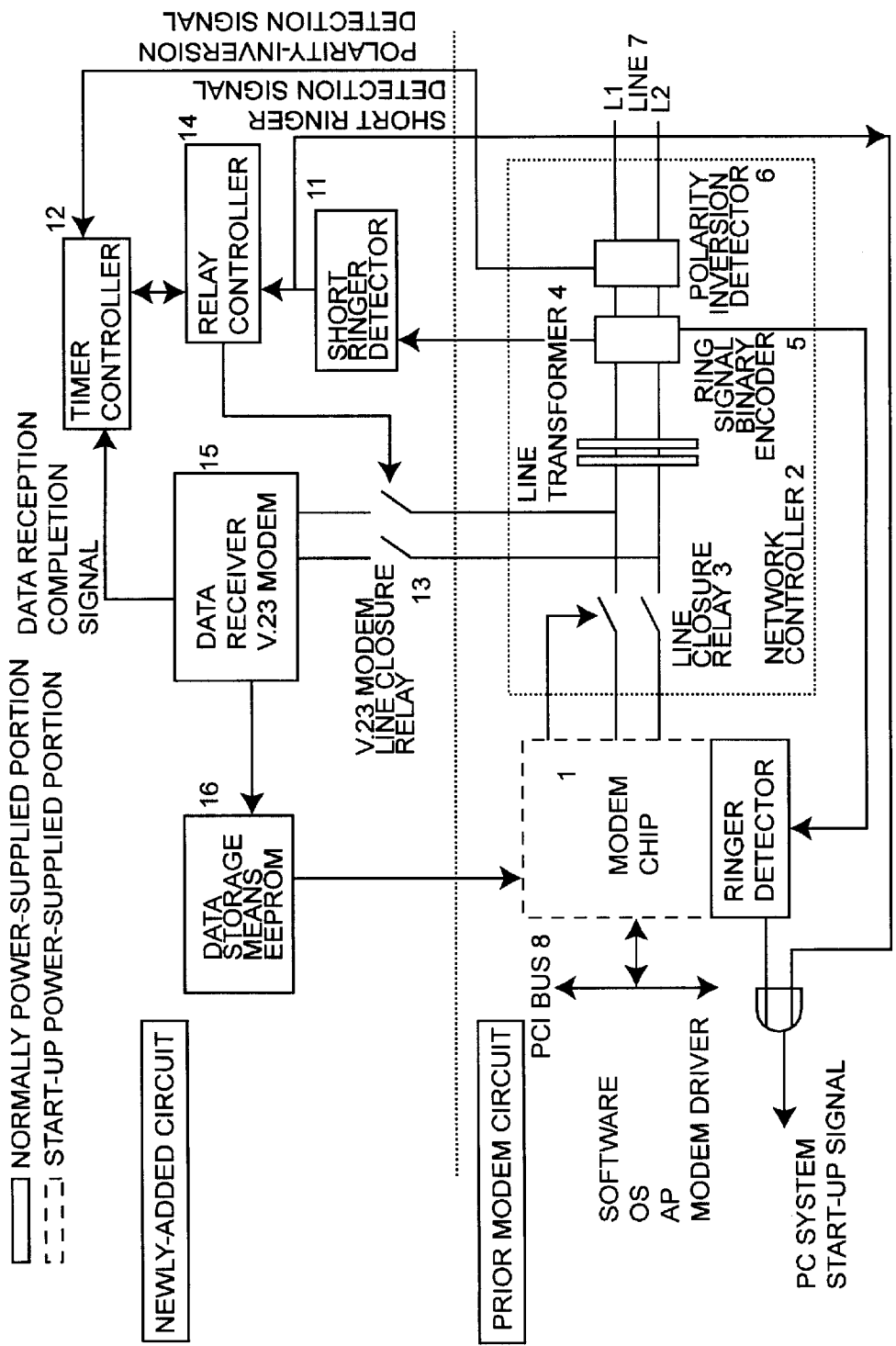

CALLER'S TELEPHONE NUMBER STORAGE APPARATUS, A PERSONAL COMPUTER, AND A CALLER'S TELEPHONE NUMBER STORAGE METHOD, AND A STORAGE MEDIUM

BACKGROUND OF THE INVENTION

The present invention relates to a personal computer, a caller's telephone number storage apparatus, a caller's telephone number storage method, and a storage medium. Particularly, the present invention relates to a personal computer, a caller's telephone number storage apparatus, a caller's telephone number storage method, and a storage medium, each that can hold the telephone numbers of incoming calls and can read out them later.

Recently, accessing to the Internet and transmission and reception of e-mails are sharply increasing in general homes. With the increasing variety of life styles, information transmission by means of termination-system applications for the conventional facsimile machines, telephone-answering machines, or the like are being still used in unattended states or at SOHO (Small Office Home Office).

The termination-system service is required to deal with 24-hour unattended operation like a sole facsimile machine or telephone answering machine. In some recent personal computers (hereinafter referred to as PC), part of the internal system can operate in a standby mode to detect incoming calls. Thus, the PC enables the start-up of the operation system (hereinafter referred to as OS), the loading to the modem driver, and moreover the start-up reception of a communication application (hereinafter referred to as AP). The PC standby-mode establishing method is roughly classified into two types. There is a tradeoff between the demerit of the delay to activation of the termination-system AP and the merit of the sleep depth of the personal computer and the resultant reduction in standby power consumption.

In a shallow sleep mode, the PC system operates widely so that the standby power consumption is not low. However, since the operation system is in a startup state and the modem driver is in a loaded state, the PC system can detect signals from a facsimile machine or telephone answering machine according to a proper application in a relative short time after incoming call detection.

In a deep sleep mode, the standby power consumption can be reduced. However, the reception procedure including the startup of an OS or the loading of a modem driver takes much time after incoming call detection. In some communication procedures, the incoming call may not be received using a proper application. There are three types of conventional modems for receiving incoming calls, that is, a controller-type modem, a controller-less-type modem and a software-type modem. The so-called controller-type modem substantially operates by itself when an AT command being a software interface from the upper application is input while the modem status is being properly reported to the upper application for the personal computer. The so-called controller-less-type modem, which is relatively inexpensive, uses the upper CPU that partially controls AT commands, data compression and correction, or the like. The software-type modem uses the upper CPU that performs modulation and demodulation. Now, a shift from the controller-type modem to the controller-less-type or software-type modem is the recent trend.

Recent personal computers and modems that can operate in the system operational state are becoming dominant. In a standby state, the system may not be able to receive according to a sleep depth or an incoming call communication procedure.

Hence, the PC power management standards are specified to meet the trend of the architecture technology of such PCs or modems. The standards are specifically called the ACPI (Advanced Configuration and Power Management Interface) which specifies the procedure of handling incoming calls from modems and performing power management.

In the ACPI standards, the S3 state, for instance, defines a sleep mode where a RAM (Random Access Memory) can hold information recoverable to the status operated immediately and previously in a relative low power consumption state so that the system can restart (resume) within a short time of about 10 seconds from an incoming call. Since the sleep mode corresponds to about three rings by a common telephone set, the incoming of a general application can be received.

Recently, a caller telephone number display service (hereinafter referred to as number display service) has been commercialized as a new service by NTT (Nippon Telegram and Telephone Corp. in Japan). However, as to the caller telephone number displaying procedure, the requirements specify that the line is primarily closed within about six seconds for data reception. The recent controller-less modems and software-type modems, described above, do not have their own intelligences. Hence, the problem is that the number display data (caller telephone number signal) cannot be received and held in the S3 state of the ACPI standards when the personal computer is in a deep sleep state to reduce its power consumption.

SUMMARY OF THE INVENTION

The present invention is made to solve the above-mentioned problems.

The objective of the invention is to provide the technique that can recognize the telephone number of an incoming call even in a sleep mode of a personal computer. In this technique, an external circuit itself holds the telephone number of an incoming call at the minimum and then the stored data is referred to, if necessary, when a suitable application activates after start-up of an operational system.

The objective of the present invention is achieved by a caller telephone number storage apparatus, wherein a caller telephone number signal is received and stored in a caller telephone number display service, comprising a detector for detecting a ring signal peculiar to a caller telephone number display service; a receiver for receiving a caller telephone number signal transmitted via a predetermined line; a switch for connecting the line to the receiver; and a line controller for controlling the switch when the detector detects the ring signal, so as to connect the line to the receiver in a predetermined reference period of time, and controlling the switch when the receiver has received the caller telephone number signal, so as to disconnect the line from the receiver; and storage means for storing a caller telephone number corresponding to the caller telephone number signal received by the receiver.

The caller telephone number storage apparatus is connected to a personal computer. The caller telephone number stored in the storage means is read out according to a predetermined application for the personal computer. The detector, the receiver, the switch, the line controller, and the storage means are power supplied normally.

The line controller controls the switch to connect the line to the receiver in six seconds after the detector has detected the ring signal.

The storage means comprises an EEPROM (Electrically Erasable Programmable Read Only Memory).

The caller telephone number storage apparatus further comprises a timer for measuring the reference time.

Moreover, the objective of the present invention is achieved by a personal computer, wherein a caller telephone number signal is received and stored in a caller telephone number display service, comprising a detector for detecting a ring signal peculiar to a caller telephone number display service; a receiver for receiving a caller telephone number signal transmitted via a predetermined line; a switch for connecting the line to the receiver; and a line controller for controlling the switch when the detector detects the ring signal, so as to connect the line to the receiver in a predetermined reference period of time, and controlling the switch when the receiver has received the caller telephone number signal, so as to disconnect the line from the receiver; storage means for storing the caller telephone number signal received by the receiver; and read-out means for reading out the caller telephone number stored in the storage means.

The detector, the receiver, the switch, the line controller, and the storage means are power supplied normally.

The line controller controls the switch to connect the line to the receiver in six seconds after the detector has detected the ring signal.

The storage means comprises a EEPROM (Electrically Erasable Programmable Read Only Memory).

The personal computer further comprises a timer for measuring the reference time.

Furthermore, the objective of the present invention is achieved by a personal computer, wherein a caller telephone number signal is received and stored in a caller telephone number display service, comprising a first receiver that operates in a system operation mode; a second receiver for receiving a caller telephone number signal transmitted via a predetermined line, the second receiver being normally power-supplied in an operation mode; a detector for detecting a ring signal peculiar to a caller telephone number display service, the detector being normally power-supplied in an operation mode; a switch for connecting the line to the first or second receiver, the switch being normally power-supplied in an operation mode; and a line controller for controlling the switch when the detector detects the ring signal, so as to connect the line to the second receiver in a predetermined reference period of time, and controlling the switch when the second receiver has received the caller telephone number signal, so as to connect the line to the first receiver, the line controller being normally power-supplied in an operation mode; storage means for storing the caller telephone number signal received by the second receiver; and read-out means for reading out the caller telephone number stored in the storage means.

The line controller controls the switch to control the line to the second receiver in six seconds after the detector has detected the ring signal.

The storage means comprises an EEPROM (Electrically Erasable Programmable Read Only Memory).

The personal computer further comprises a timer for measuring the reference time.

Moreover, the objective of the present invention is achieved by a caller telephone number storage method, wherein a caller telephone number storage apparatus is connected to a personal computer and receives and stores a caller telephone number signal in a caller telephone number display service, comprising the steps of detecting a ring signal peculiar to said caller telephone number display service; closing and opening a predetermined line; controlling the line within a predetermined reference period of time in the line closing and opening step after the ring signal is detected in the detection step; receiving the caller telephone number signal transmitted via the line closed in the line closing and opening step; and storing a caller telephone number corresponding to the caller telephone number signal received in the receiving step; the line controlling step including the step of opening the line in the line closing and opening step when the caller telephone number signal has been received in the receiving step, whereby the caller telephone number stored in the storage step is read out according to a predetermined application for the personal computer.

Moreover, the objective of the present invention is achieved by a caller telephone number storage method, wherein a caller telephone number signal is received and stored in a caller telephone number display service when a personal computer system is In a sleep mode, comprising the steps of detecting a ring signal peculiar to a caller telephone number display service from a predetermined line; closing the line in a predetermined reference period of time after the ring signal has been detected in the detection step; receiving the caller telephone number signal transmitted via the closed line; storing a caller telephone number corresponding to the received caller telephone number signal; and opening the line in the step of receiving the caller telephone number signal when the caller telephone number signal has been received.

The caller telephone number storage method further comprises the step of reading out a caller telephone number signal stored.

Moreover, the objective of the present invention is achieved by a storage medium, wherein a program is stored for receiving and storing a caller telephone number signal in a caller telephone number display service when a personal computer system is in a sleep mode, the program comprising the steps of detecting a ring signal peculiar to a caller telephone number display service from a predetermined line; closing the line in a predetermined reference period of time after the ring signal has been detected in the detection step; receiving the caller telephone number signal transmitted via the closed line; storing a caller telephone number corresponding to the received caller telephone number signal; and opening the line in the step of receiving the caller telephone number when the caller telephone number signal has been received.

The program further comprises the step of reading out a stored telephone number signal.

In the personal computer, the caller telephone number storage apparatus, the caller telephone number storage method, and the storage medium, each having the above-mentioned configuration, a ring signal peculiar to a caller telephone number display service is detected. The line is closed within a predetermined period of time when the ring signal is detected in the detection step. The caller telephone number signal transmitted via the closed line is received. A caller telephone number corresponding to the received caller telephone number signal is stored. The line is opened when the caller telephone number signal has been received. The stored caller telephone number is read out according to a predetermined application for the personal computer. In such a configuration, even when the personal computer is in a deep sleep mode, the caller telephone number can be held. Hence, when a suitable application starts up after activation of the operation system of the personal computer, the telephone number held can be read out, if necessary. This feature allows the standby power consumption of the personal computer to be reduced greatly.

BRIEF DESCRIPTION OF THE INVENTION

Figure 2:
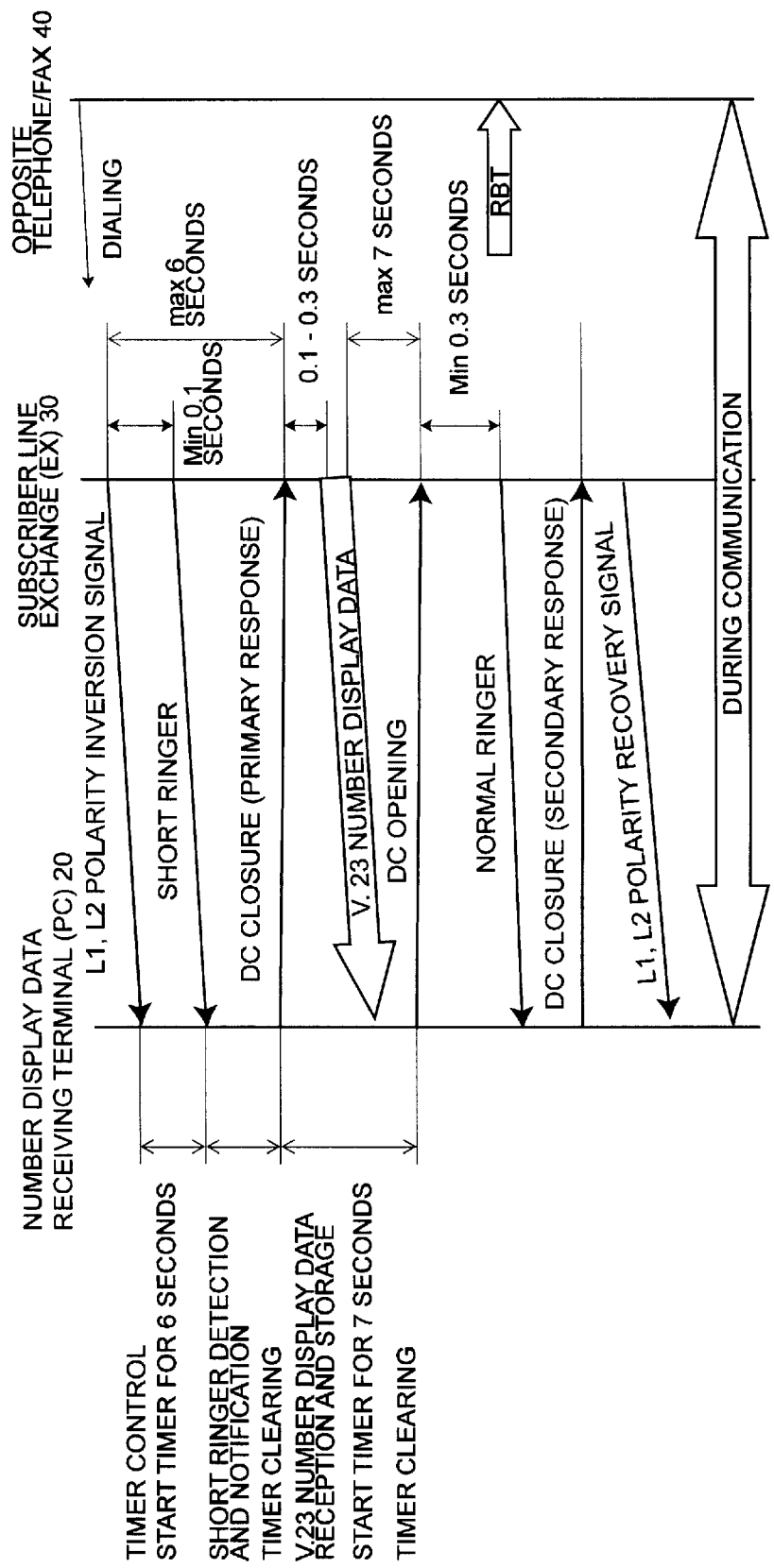

These and other objects, features, and advantages of the present invention will become more apparent upon a reading of the following detailed description and drawings, in which:

FIG. 1 is a block diagram illustrating a caller telephone number notification apparatus constituting a personal computer, according to an embodiment of the present invention; and FIG. 2 is a timing chart explaining the operation of the system shown in FIG. 1.

DESCRIPTION OF THE EMBODIMENTS

FIG. 1 is a block diagram illustrating the configuration of a caller telephone number notification apparatus configuring a personal computer, according to an embodiment of the present invention. The configuration and operation of the embodiment will be described referring to FIG. 1.

The lower section of the configuration shown in FIG. 1 represents the schematic diagram of a conventional modem circuit. A modem chip 1 used for the conventional modem circuit is the so-called controller-less modem or software-type modem currently becoming the possible mainstream. The modem chip 1 performs modulation and demodulation on, for instance, the modem board integrated in a personal computer (PC).

The conventional modem circuit is configured of the modem chip 8 connected to a PCI (Peripheral Component Interconnect) bus 8 and a network controller 2 for line connection.

The upper section in FIG. 1 represents a newly-added circuit to which power is normally supplied. The added circuit receives the number display data from a subscriber exchange (hereinafter abbreviated to an exchange) even in a deep sleep state after ringer detection of an incoming call and then stores and hold it into the data storage means 16 (e.g. EEPROM (Electrically Erasable Programmable Read Only Memory). Thus, the number display data is read out of the data storage means 16 according to the communication application (AP) after the start-up of the operation system (OS), so that a user can be notified of the caller telephone number.

As described above, the caller telephone number notification apparatus is configured of the conventional modem including the modem chip 1 of controller-less type or of software type (software modem) and the network controller 2, and the newly-added circuit. The network controller 2 includes a line closure relay 3 for making a line loop, a polarity inversion detector 6 for detecting the polarity inversion of an analog telephone line (hereinafter often abbreviated to a line) 7, a ring signal binary encoder 5 for binary-encoding a ring signal by a predetermined threshold, and a line transformer 4.

The newly-added circuit is configured of a short ringer detector 11, a timer controller 12, a V.23 modem line closure relay 13, a relay controller 14, a data receiver (V.23 modem) 15, and data storage means 16. The short ringer detector 11 detects a short ringer used in the number display service (caller telephone number display service) provided by NTT. The timer controller 12 primarily closes or opens the line 7 according to the procedure of a number display service. The V.23 modem line closure relay 13 performs line closure. The relay controller 14 controls the relay 13. The data receiver 15 demodulates V.23-modulated data. The data storage means 16 holds received data.

Next, the operation of the caller telephone number notification apparatus will be described with reference to the timing chart of FIG. 2.

Referring to FIG. 2, when the telephone/FAX 40 shown in the right dials the telephone number of the number display data receiving terminal (referred to as PC) 20 shown in the left, the subscriber line exchange (EX) 30 shown in the center transmits L1 and L2 polarity inversion signals via the line 7 to the number display data receiving terminal 20.

The polarity inversion detector 6 detects L1 and L2 polarity inversion signals transmitted from the EX 30. The number display date receiving terminal 20 creates a polarity inversion detection signal to the timer controller 12. The number display data receiving terminal 20 notifies the timer controller 12 of the polarity inversion signal inverted. The timer controller 12 starts time-measuring six seconds for which the dc closure is performed.

Thereafter, when a short ringer where a 16-Hz signal is turned on/off at 0.5 second intervals comes via the line 7, the short ringer detector 11, which is normally connected to the line 7 via the ring signal binary-encoder 5, analyzes the frequency and period of the short ringer, thus detecting the short ringer. The short ringer detector 11 supplies the short ringer detection signal to the relay controller 14 within six seconds during which the timer controller 12 is time-measuring. The short ringer detection signal is supplied as the PC system startup signal to the personal computer (PC) 20.

The relay controller 14 (FIG. 1), which has been notified of the detection of the short ringer with the short ringer detection signal, closes the V.23 modem line closure relay 13 operating exclusively to the line closure relay 3 used in a normal mode to perform dc closure (or primary response) to the line 7. At this time, the timer controller 12 temporarily clears the time-measuring operation.

Thereafter, the data receiver (V.23 modem) 15 receives the V.23 number display data transmitted by the EX 30 and then stores it into the data storage means (EEPROM) 16.

Respective means involved in the above-mentioned operation are in an active state because being normally power-supplied even in a standby state of the PC 20 itself.

Next, the data receiver (V.23 modem) 15 notifies the timer controller 12 of the data reception completion signal after data storage. Then the timer controller 12 time-measures for seven seconds only. The relay controller 14 opens the V.23 modem line closure relay 13 in seven seconds to set the line 7 to a dc open state. At this stage, the time measurement of the timer controller 12 is cleared.

Then, the EX 30 transmits a normal ringer. Thereafter, the telephone answering machine or FAX modem performs response/recording or reception according to the signals in the conventional termination procedure. That is, the normal ringer transmitted via the line 7 is transmitted to the modem chip 1 and the PC 20 via the ringer detector 21. The modem chip 1 controls to close the line closure relay 3 and to perform dc closure (secondary response) of the line 7. Thereafter, the EX 30 sends the L1 and L2 polarity recovery signals to carry out the normal communication.

The number display data stored in the data storage means 16 are read by a predetermined application software for the PC 20 and then are displayed on the screen or recorded on a hard disk.

As described above, even in such conditions that the main power supply of the PC 20 is in an off state and that the modem chip 1 is in the state before coming under control by the operation system (OS) of the PC 20 and that the modem chip 1 is in the state before the software-driven modem driver is loaded under control of the OS, the newly-added circuit itself can receive and hold number display data. After the activation of the OS, the number display data held can be read out and checked, if necessary, by means of a suitable communication application.

The following advantages can be obtained by the caller telephone number storage apparatus according to the present invention. It is assumed that the PC is in a deep sleep state, for instance, in the S4 state where about one minute is taken between the startup of OS and activation of a communication AP (where S represents that the whole PC system is in a sleep state and the attached number represents the depth of sleep) or in the S3 state where about ten seconds are taken between the startup of OS and activation of a communication AP. Moreover, it is assumed that the modem is a controller-less modem or software-based modem that functions by the driver effective after OS startup. Even in such a case, the newly-added circuit can response to the number display signal from the line 7 within six seconds and can receive the caller telephone number data (number display data), thus storing and holding it into a predetermined memory.

Moreover, since the newly-added circuit can hold a caller telephone number even in a deeper sleep state, the whole power consumption of the PC 20 can be sufficiently lowered. Hence, when being used personally or in SOHO, the voice/FAX services can be economically used in an outdoor mode or in an unattended mode.

Number display data or storage data is taken out from a suitable communication AP after startup of OS so that a caller telephone number can be displayed and recognized.

Furthermore, even when the telephone answering machine holds silence or an interrupted call or even when information sent by a FAX machine does not show its originating source, the personal computer can specify the caller. Hence, the personal computer can respond to the opponent party or can prevent a mischievous call.

The above-mentioned embodiment is effective in the case where the party displaying a caller's telephone number Joins the number display service or the case where a caller does not purposely set a non-display mode to an exchange.

Moreover, in the above-mentioned embodiment, the number display data can be stored into other storage medium, in place of the EEPROM.

The entire disclosure of Japanese Application No. 10-335047 filed Nov. 11, 1998 including specification, claims, drawing and summary are incorporated herein by reference in its entirely.

What is claimed is:

1. A caller telephone number storage apparatus, wherein a caller telephone number signal is received and stored in a caller telephone number display service, comprising:
    a detector for detecting a ring signal peculiar to a caller telephone number display service;
    a receiver for receiving a caller telephone number signal transmitted via a predetermined line;
    a switch for connecting said line to said receiver; and
    a line controller for controlling said switch when said detector detects said ring signal, so as to connect said line to said receiver in a predetermined reference period of time, and controlling said switch when said receiver has received said caller telephone number signal, so as to disconnect said line from said receiver; and
    storage means for storing a caller telephone number corresponding to said caller telephone number signal received by said receiver.

2. The caller telephone number storage apparatus defined in claim 1, wherein said caller telephone number stored in said storage means is read out according to a predetermined application for a personal computer which is connected to said caller telephone number storage apparatus.

3. The caller telephone number storage apparatus defined in claim 1, wherein said detector, said receiver, said switch, said line controller, and said storage means are power supplied normally.

4. The caller telephone number storage apparatus defined in claim 1, wherein said line controller controls said switch to connect said line to said receiver in six seconds after said detector has detected said ring signal.

5. The caller telephone number storage apparatus defined in claim 1, wherein said storage means comprises an EEPROM (Electrically Erasable Programmable Read Only Memory).

6. The caller telephone number storage apparatus defined in claim 1, further comprising a timer for measuring said reference time.

7. A personal computer, wherein a caller telephone number signal is received and stored in a caller telephone number display service, comprising:
    a detector for detecting a ring signal peculiar to a caller telephone number display service;
    a receiver for receiving a caller telephone number signal transmitted via a predetermined line;
    a switch for connecting said line to said receiver;
    a line controller for controlling said switch when said detector detects said ring signal, so as to connect said line to said receiver in a predetermined reference period of time, and controlling said switch when said receiver has received said caller telephone number signal, so as to disconnect said line from said receiver;
    storage means for storing said caller telephone number signal received by said receiver; and
    read-out means for reading out said caller telephone number stored in said storage means.

8. The personal computer defined in claim 7, wherein said detector, said receiver, said switch, said line controller, and said storage means are power supplied normally.

9. The personal computer defined in claim 7, wherein said line controller controls said switch to connect said line to said receiver in six seconds after said detector has detected said ring signal.

10. The personal computer defined in claim 7, wherein said storage means comprises a EEPROM (Electrically Erasable Programmable Read Only Memory).

11. The personal computer defined in claim 7, further comprising a timer for measuring said reference time.

12. A personal computer, wherein a caller telephone number signal is received and stored in a caller telephone number display service, comprising:
    a first receiver that operates in a system operation mode;
    a second receiver for receiving a caller telephone number signal transmitted via a predetermined line, said second receiver being normally power-supplied in an operation mode;
    a detector for detecting a ring signal peculiar to a caller telephone number display service, said detector being normally power-supplied in an operation mode;
    a switch for connecting said line to said first or second receiver, said switch being normally power-supplied in an operation mode; and a line controller for controlling said switch when said detector detects said ring signal, so as to connect said line to said second receiver in a predetermined reference period of time, and controlling said switch when said second receiver has received said caller telephone number signal, so as to connect said line to said first receiver, said line controller being normally power-supplied in an operation mode;

storage means for storing said caller telephone number signal received by said second receiver; and read-out means for reading out said caller telephone number stored in said storage means.

13. The personal computer defined in claim 12, wherein said line controller controls said switch to control said line to said second receiver in six seconds after said detector has detected said ring signal.

14. The personal computer defined in claim 12, wherein said storage means comprises an EEPROM (Electrically Erasable Programmable Read Only Memory).

15. The personal computer defined in claim 12, further comprising a timer for measuring said reference time.

16. A caller telephone number storage method, wherein a caller telephone number storage apparatus is connected to a personal computer and receives and stores a caller telephone number signal in a caller telephone number display service, comprising the steps of:

detecting a ring signal peculiar to said caller telephone number display service;

closing and opening a predetermined line;

controlling said line within a predetermined reference period of time in said line closing and opening step after said ring signal is detected in said detection step;

receiving said caller telephone number signal transmitted via said line closed in said line closing and opening step; and storing a caller telephone number corresponding to said caller telephone number signal received in said receiving step;

said line controlling step including the step of opening said line in said line closing and opening step when said caller telephone number signal has been received in said receiving step, whereby said caller telephone number stored in said storage step is read out according to a predetermined application for said personal computer.

17. A caller telephone number storage method, wherein a caller telephone number signal is received and stored in a caller telephone number display service when a personal computer system is in a sleep mode, comprising the steps of:

detecting a ring signal peculiar to a caller telephone number display service from a predetermined line;

closing said line in a predetermined reference period of time after said ring signal has been detected in said detection step;

receiving said caller telephone number signal transmitted via said closed line;

storing a caller telephone number corresponding to said received caller telephone number signal; and opening said line in said step of receiving said caller telephone number signal when said caller telephone number signal has been received.

18. The caller telephone number storage method defined in claim 17, further comprising the step of reading out a caller telephone number signal stored.

19. A storage medium, wherein a program is stored for receiving and storing a caller telephone number signal in a caller telephone number display service when a personal computer system is in a sleep mode, said program comprising the steps of:

detecting a ring signal peculiar to a caller telephone number display service from a predetermined line;

closing said line in a predetermined reference period of time after said ring signal has been detected in said detection step;

receiving said caller telephone number signal transmitted via said closed line;

storing a caller telephone number corresponding to said received caller telephone number signal; and opening said line in said step of receiving said caller telephone number when said caller telephone number signal has been received.

20. The storage medium defined in claim 19, wherein said program further comprises the step of reading out a stored telephone number signal.

* * * * *